(12) United States Patent
Joitescu et al.

(10) Patent No.: US 6,676,163 B2
(45) Date of Patent: Jan. 13, 2004

(54) REPLACEABLE FUEL SYSTEM MODULE AND METHOD

(75) Inventors: Sorin Joitescu, Calgary (CA); Ulrich Imhof, Calgary (CA)

(73) Assignee: Dynetek Industries Ltd., Calgary (CA)

( * ) Notice: Subject to any disclaimer, the term of this patent is extended or adjusted under 35 U.S.C. 154(b) by 0 days.

(21) Appl. No.: 10/146,685

(22) Filed: May 16, 2002

(65) Prior Publication Data

US 2002/0171236 A1 Nov. 21, 2002

Related U.S. Application Data (60) Provisional application No. 60/291,322, filed on May 17, 2001.

(51) Int. Cl.$^7$ .................................................. B60P 3/22
(52) U.S. Cl. ........................................................ 280/834
(58) Field of Search ................................ 280/830, 834; 414/331.01

(56) References Cited

U.S. PATENT DOCUMENTS

| | | |
|---|---|---|
| 4,106,581 A | 8/1978 | West et al. |
| 4,457,525 A | 7/1984 | Tanaka et al. |
| 4,770,428 A | 9/1988 | Sugiyama |
| 5,370,418 A | 12/1994 | Pugh |
| 5,443,578 A | 8/1995 | Davis, Jr. |
| 5,518,272 A | 5/1996 | Fukagawa et al. |
| 5,658,013 A | 8/1997 | Bees et al. |
| 5,673,939 A | 10/1997 | Bees et al. |
| 5,702,125 A | 12/1997 | Nakajima et al. |
| 5,794,979 A | 8/1998 | Kasuga et al. |
| 5,806,892 A * | 9/1998 | Colburn ........................ 280/834 |
| 5,810,309 A | 9/1998 | Augustine et al. |
| 5,845,940 A * | 12/1998 | Colburn ........................ 280/830 |
| 5,992,885 A | 11/1999 | Fukagawa et al. |
| 5,997,040 A | 12/1999 | Fukagawa et al. |
| 6,042,071 A | 3/2000 | Watanabe et al. |
| 6,053,533 A * | 4/2000 | Osborn et al. ............... 280/830 |
| 6,086,103 A | 7/2000 | Fukagawa et al. |
| 6,257,360 B1 * | 7/2001 | Wozniak et al. ........... 180/69.5 |
| 2003/0001059 A1 * | 1/2003 | Kim et al. ............. 248/346.01 |

FOREIGN PATENT DOCUMENTS

| | | |
|---|---|---|
| EP | 0 872 372 A1 | 10/1998 |
| EP | 1 092 612 A1 | 4/2001 |

* cited by examiner

Primary Examiner—Kevin Hurley
(74) Attorney, Agent, or Firm—Sean W. Goodwin (57) ABSTRACT

A unitary fuel system module comprising one or more fuel cylinders mounted to a frame as a module, preferably through neck-mounts, and having fueling lines for connecting the fuel cylinders to the vehicle. The frame is fitted with a latching mechanism that is readily actuated for alternately securing the frame to the fuel supply envelope in the vehicle or releasing the frame for removal of the fuel module as a unitary structure. Preferably, the frame is fitted with wheels or slides to enable sliding the module in and out of the envelope. In operation, as required return a vehicle to operation, a faulty module can be replaced with a replacement module, which is slid into the envelope where it is secured and the fueling lines are re-connected to the vehicle.

4 Claims, 8 Drawing Sheets

REPLACEABLE FUEL SYSTEM MODULE AND METHOD

This claims the benefit of provisional application No. 60/291,322 filed on May 17, 2001.

FIELD OF THE INVENTION

The present invention relates to the field of vehicular fuel storage and supply systems and more particularly to replaceable fuel systems for alternative fuels such as compressed natural gas (CNG), hydrogen, and liquefied natural gas (LNG).

BACKGROUND OF THE INVENTION

Typically, on-board vehicular fuel supply systems comprise one or more fuel tanks integrated into the chassis of a vehicle. Installation of the fuel system is a part of the vehicle's basic construction and is typically performed in assembly-line fashion at the factory.

Fuel systems such as described in U.S. Pat. No. 5,794,979 to Kasuga et al. are designed for alternative fuels such as CNG or LNG where a plurality of compressed pressurized fuel cylinders are mounted in a vehicle. A tank supporting frame, installed complete with the fuel tanks and associated pipes and seals, is preferably installed through a rear window opening, during initial manufacture of the vehicle. The frame, following insertion into the fuel storage envelope in the vehicle, is subsequently bolted to the car body and the ends of the pipes connected to the ends of the fuel lines on the car body. Once installed in this fashion, the fuel system becomes an integral part of the vehicle body and cannot be readily removed for inspection, repair or replacement.

Malfunction in any part of the system results in costly repair and significant down-time as the vehicle must be removed from the road. Costs escalate with increasing time to disassemble portions of the vehicle to gain access to the system, perform repairs and reassemble the vehicle.

U.S. Pat. No. 5,997,040 to Fukagawa et al. teaches a modularized and compact fuel system comprising a support frame bolted to the car-body side supporting frame, a single fuel cylinder secured to the support frame using belly straps and a joint box for connection of the fuel and fill lines from the tank to the lines of the vehicle. The frame taught in Fukagawa is not readily adapted to secure more than one fuel cylinder nor is there any indication that fuel lines from a plurality of fuel cylinders could be integrated into the joint box provided. Fukagawa teaches additional side frame components being bolted first at each side of the car body prior to installation of the module. The fuel tank attached to the remaining portion of the frame is then inserted into the car body through a rear door and moved rearward between the wheel housings to align with the side frame component. Once aligned, the module is bolted into place. If maintenance is required, the reverse steps are performed including un-bolting all the fasteners for lifting the module free of the vehicle. Fukagawa avoids multiple vessels so as to ensure a compact module for ease of installation. A larger vessel or a plurality of vessels are not contemplated.

Where a plurality of vessels is required to increase the capacity of the system, the single vessel system of Fukagawa is no longer applicable.

Clearly there is a need for a lightweight fuel system comprising a plurality of pressurized fuel cylinders held together in a unitary structure complete with piping and valves that can be safely secured to the body of a vehicle when in use, but be readily removable for service. Securing means that can be readily released, combined with removable piping connections would allow the entire fuel system to be removed from its permitted dimensional fuel storage envelope in the vehicle for inspection or servicing. Further, a modular system could be replaced even on site, as a single module, should it malfunction. Swapping of a replacement module for the faulty module permits rapid repairs and also avoids unnecessary delays.

SUMMARY OF THE INVENTION

The present invention overcomes the prior art requirement for labor intensive and costly servicing, inspection or replacement of a fuel system. A lightweight, unitary fuel system module is provided that can be quickly and removably secured to a vehicle body. The module is easily unlatched from the body and, with minimal detachment of piping connections, can be partially or completely removed, as a complete module, from the vehicle for inspection, repair or reinsertion. Should the module require unknown or extensive repair or component replacement, the entire used module can be replaced by a second replacement module to minimize on-road time losses.

In a broad aspect of the invention, a modular fuel system is provided for a vehicle having fuel lines and a fuel storage envelope, the fuel system comprising:

one or more pressurized fuel cylinders;

a frame in which the one or more fuel cylinders are mounted to form a replaceable module; and     a latching mechanism attached to the frame and adapted for cooperating with anchors in the envelope for releasably securing the frame within the vehicular envelope and operable between a first secured position and a second released position.

Such replaceable modules are self supporting during removal and replacement steps. Preferably, each fuel cylinder has a longitudinal axis and opposing neck ends, the opposing neck ends of each of the one or more fuel cylinders being neck-mounted to the frame. The fuel cylinders, associated instrumentation and tubing are secured to the frame for insertion into the vehicle as a unitary module.

In a preferred embodiment of the invention, the fuel cylinders and associated tubing are housed in a mounting frame comprising at least two end brackets. The brackets are lightweight and designed to permit neck-mounting of each fuel cylinder at opposing neck ends. The frame is secured to the structure of a fuel storage envelope within the vehicle using a releasable latching mechanism capable of safely securing the frame under crash loading. Further, the frame is fitted with means to allow easy removal of-the-system-as a module, such as roller wheels or cooperating Teflon slides.

Preferably, the fuel cylinders are lightweight fiber reinforced, aluminum-lined fuel cylinders having opposing neck-ends, capable of storing pressurized fuel gas such as hydrogen. Instrumentation associated with delivery and monitoring of fuel is provided. Three lines of pressure tubing are typically used for connecting the fuel cylinders to the vehicle; a filling line, a fuel line and a venting line. Each line is housed within a mounting frame for connection to the fuel cylinders, in parallel. The fueling lines converge at a periphery of the frame for ease of connection to the vehicle. Removable fittings join the three lines to corresponding lines on the vehicle body. More preferably, the frame further comprises crossbeams for additional structural rigidity and for attachment of the latching mechanism to the underside of the frame. With pressurized fuel cylinders, the neck-mounting attachments are preferably adapted to permit some longitudinal expansion at least atone neck-mount.

In another aspect of the invention, a method for removal and replacement of a used module of the present invention from a vehicle fuel storage envelope is provided, the method comprising the steps of:

providing at least two modules, a used module and a replacement module, each module having one or more fuel cylinders mounted to a frame, the frame having a latching mechanism for securing the mounting frame to the vehicular envelope;

disconnecting means for fluidly connecting the pressurized fuel cylinders with fuel lines in the vehicle;

actuating the latching mechanism of the used module from a first secured position to a second released position; then sequentially removing the used module from the vehicle's envelope;

inserting a replacement module into the vehicle's envelope; and then actuating the latching mechanism of the replacement module for securing the mounting frame to the vehicle from a second released position to a first secured position; and reconnecting the means for fluidly connecting the pressurized fuel cylinders with the fuel lines in the vehicle.

The method is particularly convenient when two or more fuel cylinders are involved in the module.

DETAILED DESCRIPTION OF THE PREFERRED EMBODIMENT

Figure 1:
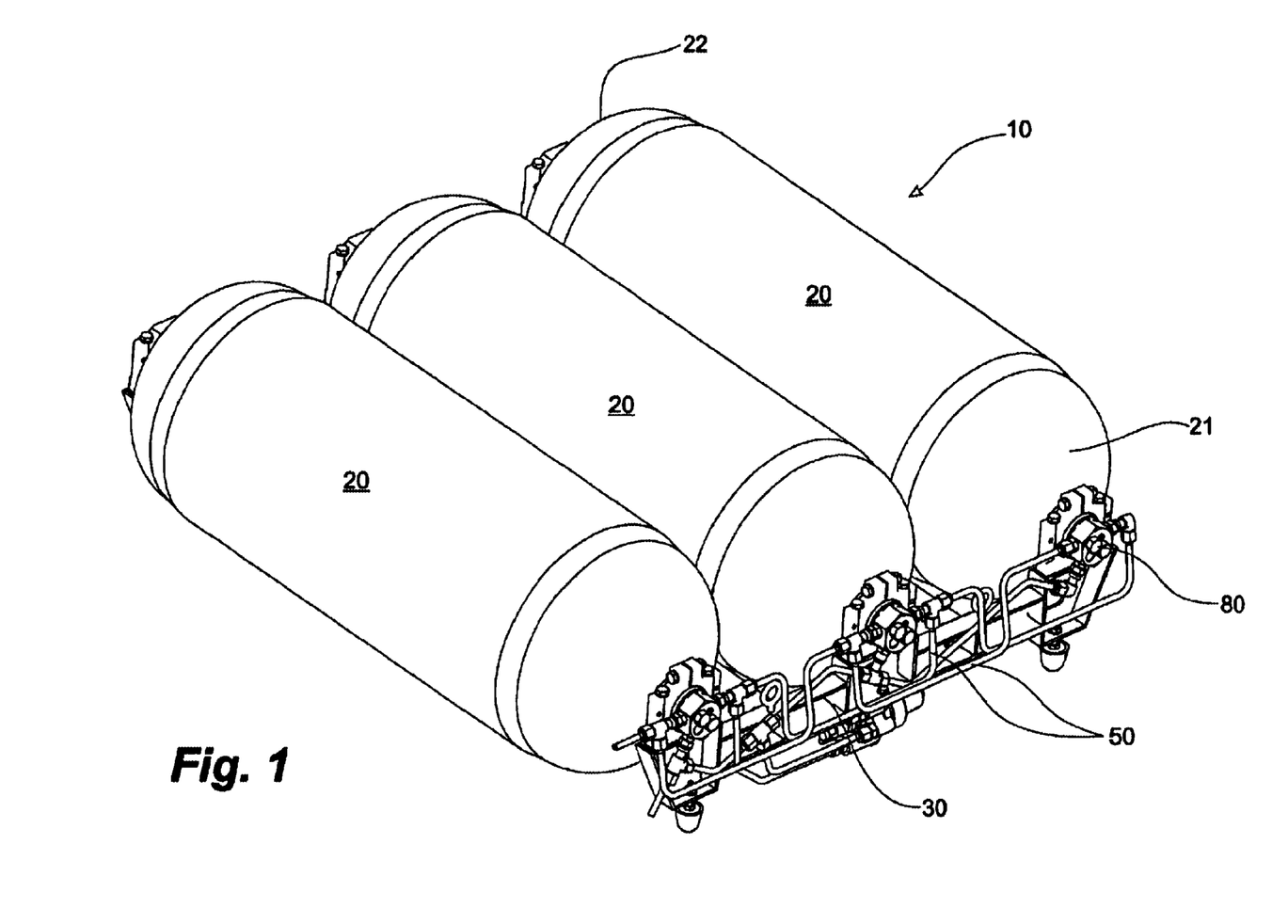
FIG. 1 is a perspective view of the fuel system module of the present invention.
Figure 2:
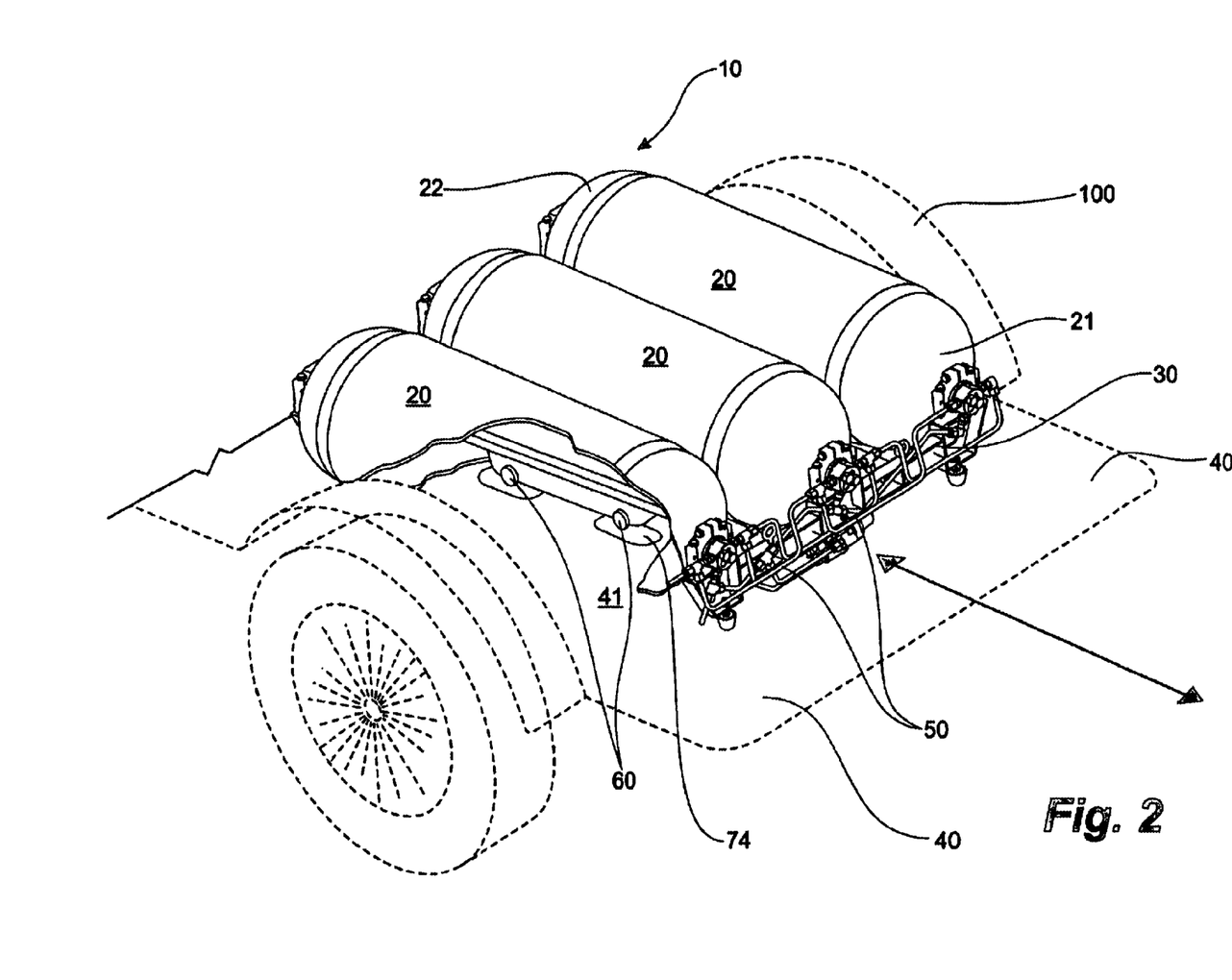
FIG. 2 is a perspective view of the fuel system module of FIG. 1 installed in a rear fuel storage envelope in a vehicle and having a cut away in one fuel cylinder to show an anchoring mechanism of the present invention securing the module into the envelope.
Figure 3:
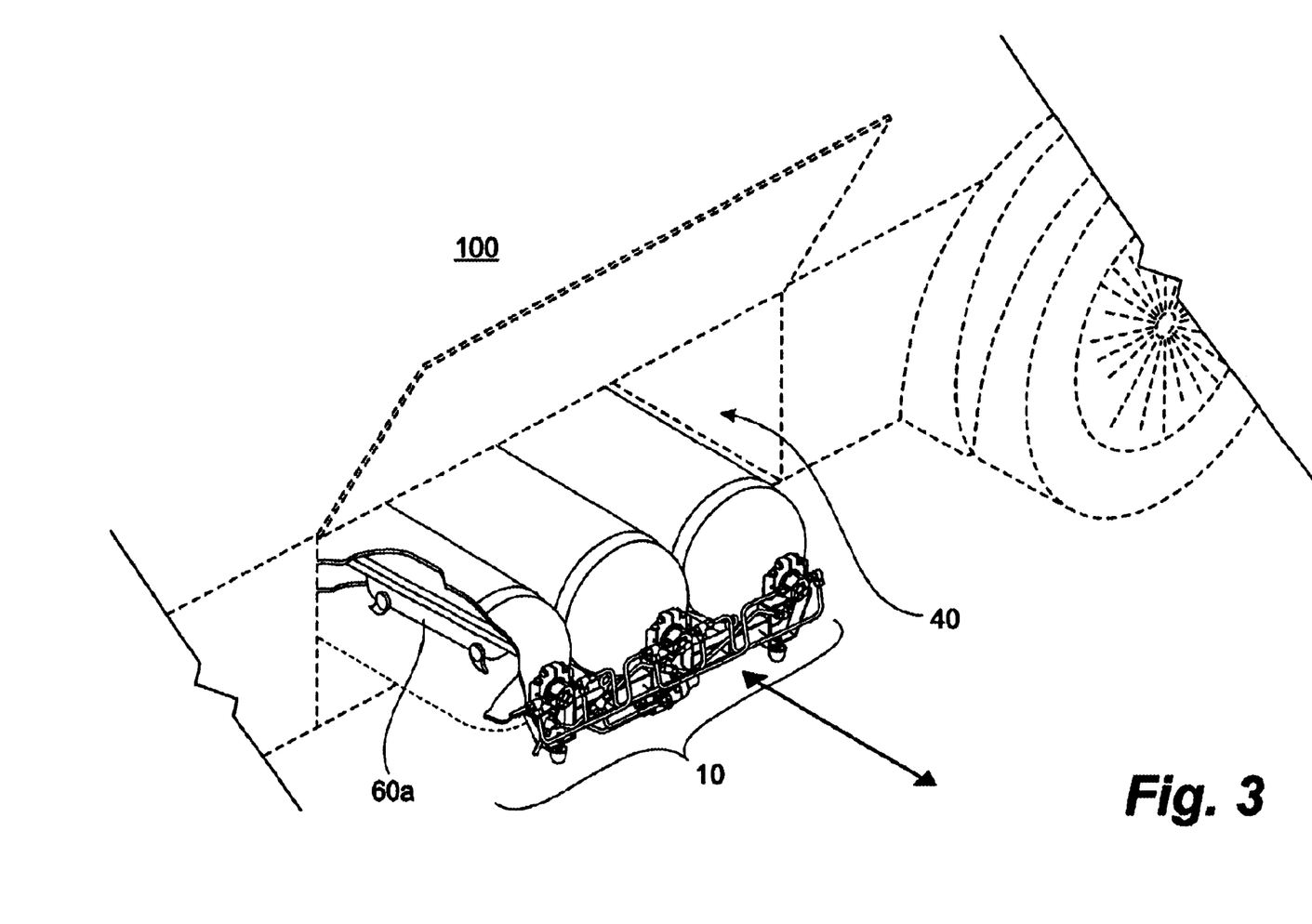
FIG. 3 is a perspective view of the fuel system module of FIG. 1 partially installed in an underbody fuel storage envelope in the side of a vehicle.

Having reference to FIGS. 1–3, a modular fuel system 10 of the present invention is shown. A plurality of pressurized fuel cylinders 20 are attached to a frame 30 for insertion, as a module 10, into a fuel storage envelope 40 in a vehicle 100. Further, fueling tubing or lines 50 associated with filling and venting the fuel cylinders 20, as well as fueling the vehicle 100, are provided. As shown in FIGS. 2 and 3, the frame 30 is secured to the structure of the fuel storage envelope 40, using a releasable latching mechanism 60.

Figure 4:
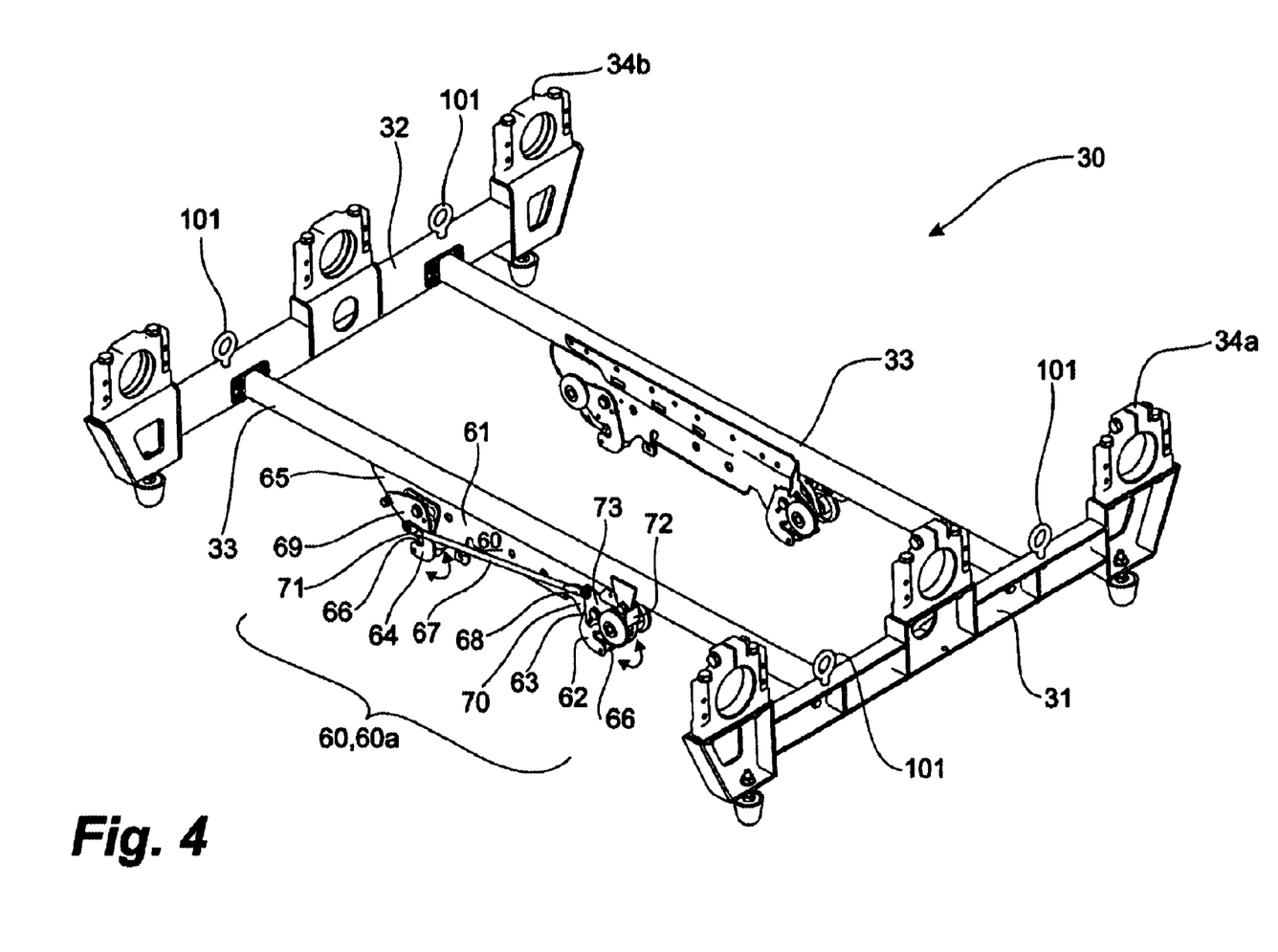
FIG. 4 is a perspective view of the frame of the fuel system module of FIG. 1 showing the brackets, cross-beams; anchoring mechanism and neck-mounting attachments.
Figure 5:
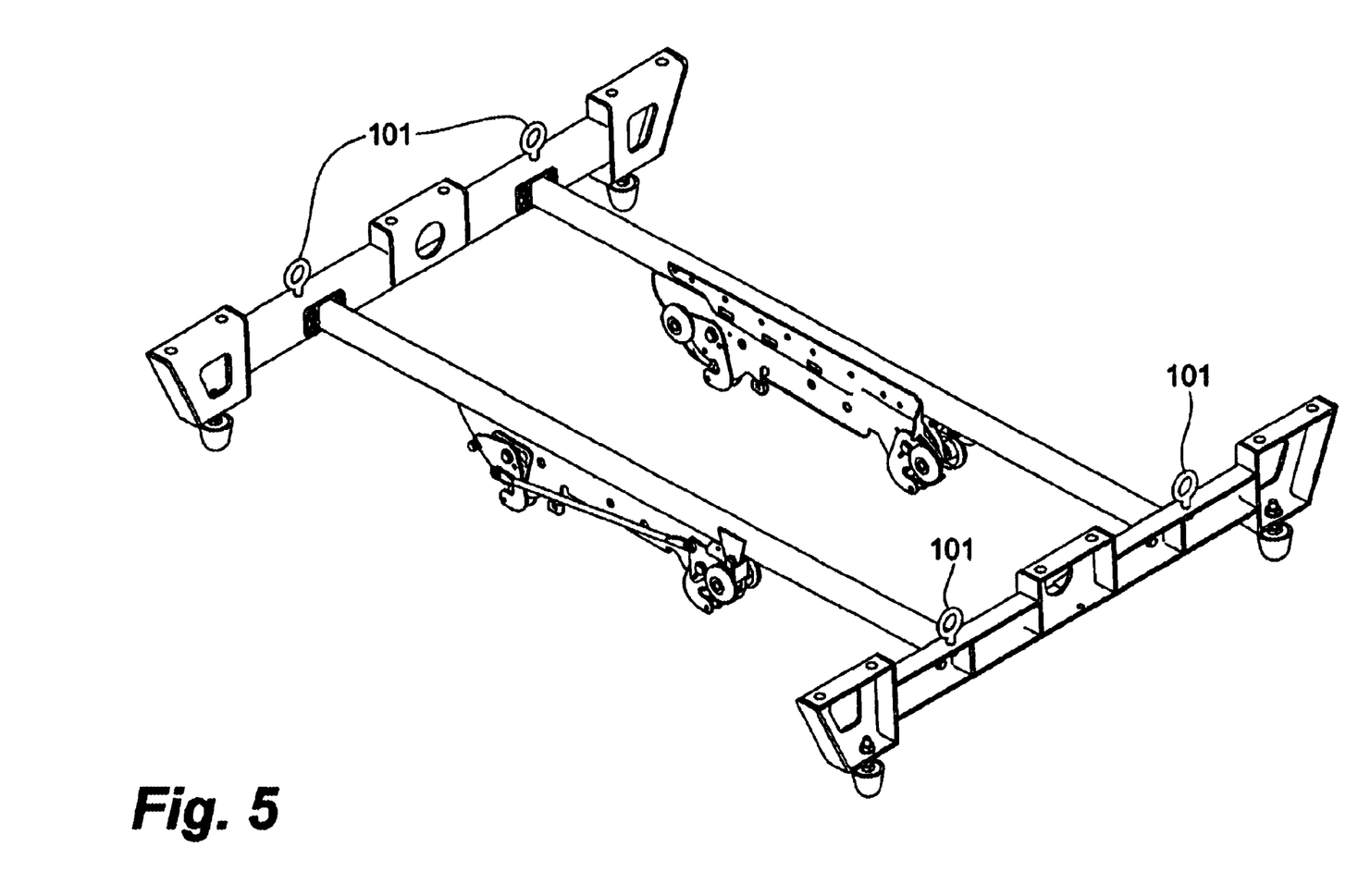
FIG. 5 is a perspective view of the frame of the fuel system module according to FIG. 4 without the neck-mounting attachments.
Figure 6:
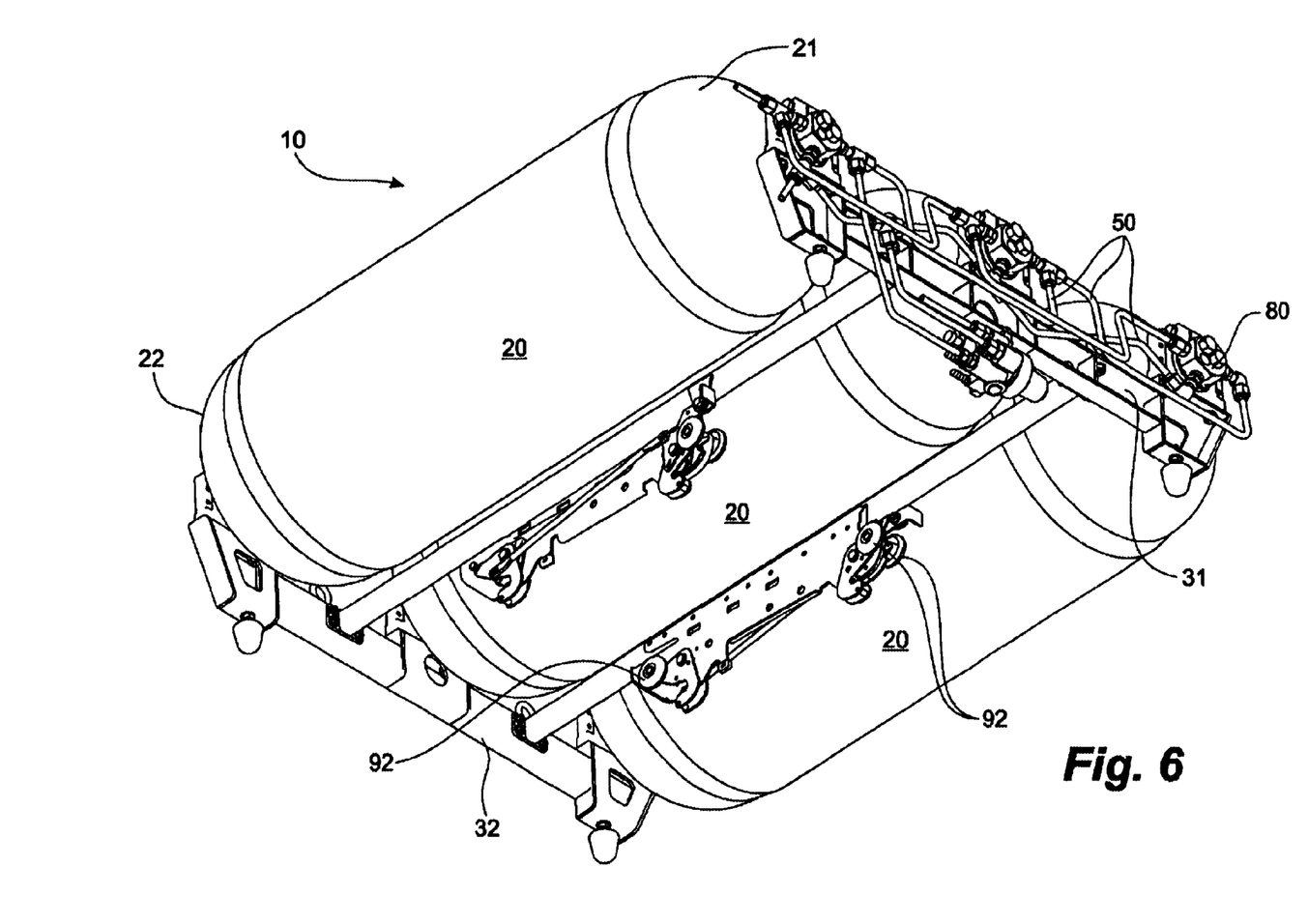
FIG. 6 is a perspective view of the underside of the fuel system module according to FIG. 1 showing the anchoring mechanism in a secured position and the wheels retracted.

The frame, as shown in FIGS. 4–5, comprises first and second end brackets 31, 32 spaced and secured to the fuel cylinders 20. Preferably, one or more cross beams 33 extend between the brackets 31,32 in part to provide additional structural rigidity and to provide additional points of attachment as necessary. One or more sets of neck-mounting attachments 34a, 34b are bolted to the frame brackets 31,32 for neck-mounting opposing neck ends 21,22 of each pressurized fuel cylinder 20.

Alternatively, fuel cylinders 20 can be mounted to the crossbeams 33 of the frame 30, using conventional belly straps (not shown).

Figure 7:
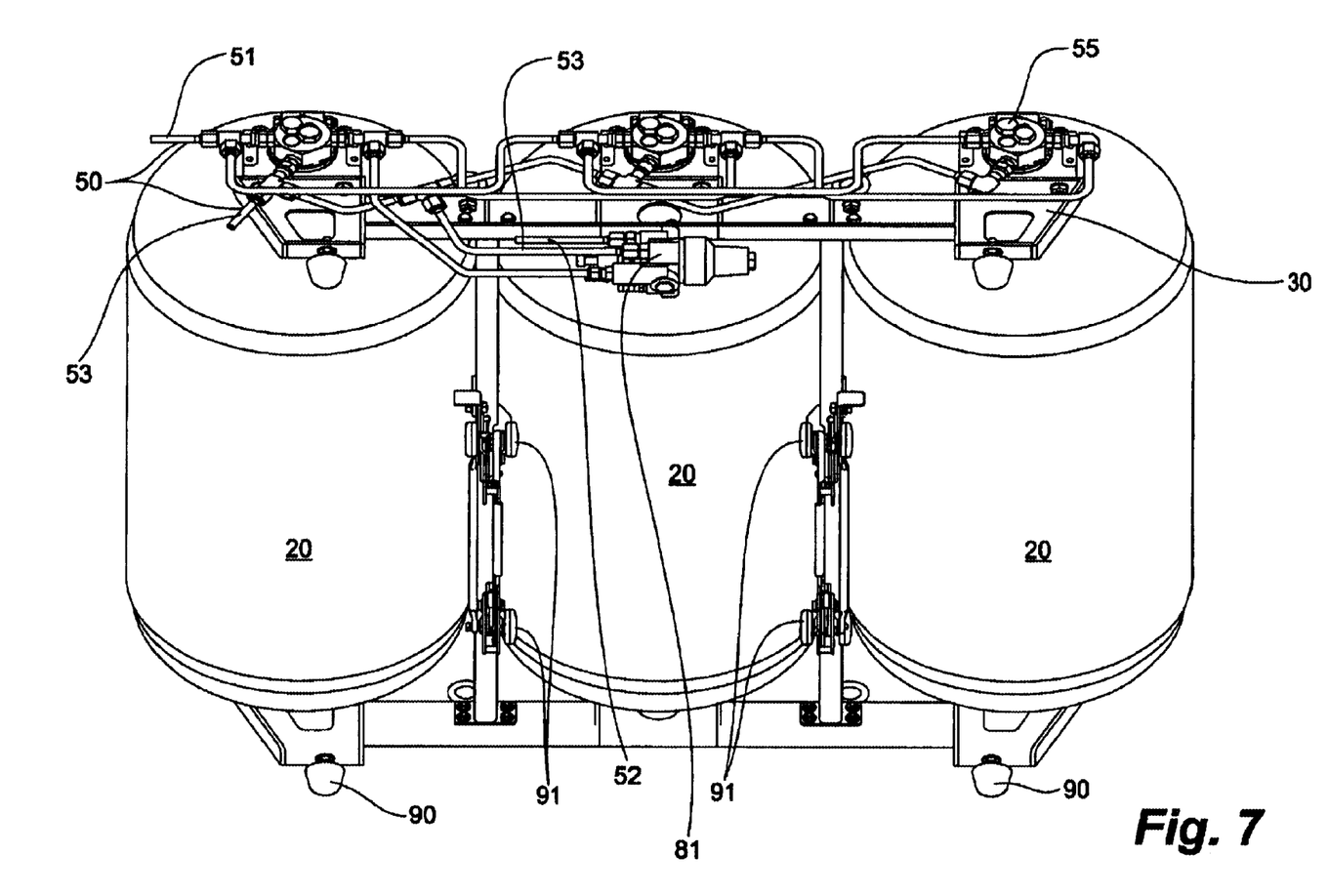
FIG. 7 is a front view of the underside of the fuel system module according to FIG. 1 showing the anchoring mechanism.

Preferably, the pressurized fuel cylinders 20 are fixed at threaded neck-mounting attachments 34a at one or either end bracket 31,32 of the frame 30 by a fixed or threaded neck end 21,22 into which a valve assembly 55 and fueling lines 50 are fit (FIG. 7). The neck-mounting attachments 34b at the opposing ends of the fuel cylinders 22,21 are slidably fit, such as with plastic bushings (not shown), which support the fuel cylinder's neck end 22 yet still allows for lineal expansion of the pressurized fuel cylinders 20 such as under fill/empty pressures cycles.

In one embodiment of the invention, as shown in FIGS. 4–7, the latching mechanism 60 comprises one or more anchoring mechanisms 60a fixed to the frame 30, such as to the cross-beams 33. Each anchoring mechanism 60a comprises a support bracket 61, having a first hook 62 at a first end 63 and a second hook 64 at a second end 65 of the support bracket 61. Each hook 62,64 is pivotally attached to the support bracket 61 and can be actuated from an open, released position to a closed, secured position. The hooks 62,64 happen to be oriented with open sides 66 facing in opposing directions (shown facing away from each other) for co-operating with corresponding and complementary anchors 74 (as seen in FIG. 2) in the envelope 40.

Each hook 62,64 is pivotally connected to the support bracket 61 and to an actuation arm 67 at the arm's first 68 or second end 69 respectively. For contra-rotation of the opposing hooks, the actuation arm 67 extends from a top 70 of the first hook 62 to a bottom 71 of the second hook 64. The actuation arm 67 is further connected to a handle 72 at the first end 63. As the handle 72 is depressed, the adjacent first hook 62 is caused to pivot about its attachment 73 to the support bracket 61, the open side 66 pivoting downward, to a released position. At the same time, the second hook 64 is caused to pivot downward, also to a released position. When the handle 72 is lifted, the hooks 62,64 are caused to pivot away from one another to a secured position in engagement with anchors 74 formed in the envelope 40 (FIG. 2.).

Optionally, the handle 72 is positioned at a periphery of the frame 30 or at a location remote from the module 10 to provide easy access for actuating the latching mechanisms 60. This may be of particular importance in vehicular envelopes 40 that are severely space-restricted where access to the underside of the frame 30 is limited.

As shown in FIG. 2, loop-like anchors 74 are provided in the structure of the fuel storage envelope 40, typically at a base 41 of the envelope 40, through which the hooks 62,64 of the anchoring system 60a extend when in the secured position. In this secured position, the frame 30 is safely secured to the vehicle 100. Finite element analysis of the module 10 confirms structural performance under regulatory requirements such loading with 25 g in planes parallel and perpendicular to the pressurized fuel cylinder's axis and 5 g in the vertical plane. One form of the latching mechanisms of the type herein disclosed are typically found in the automobile industry for use in securing rear bench seats to the vehicular frame.

Figure 8:
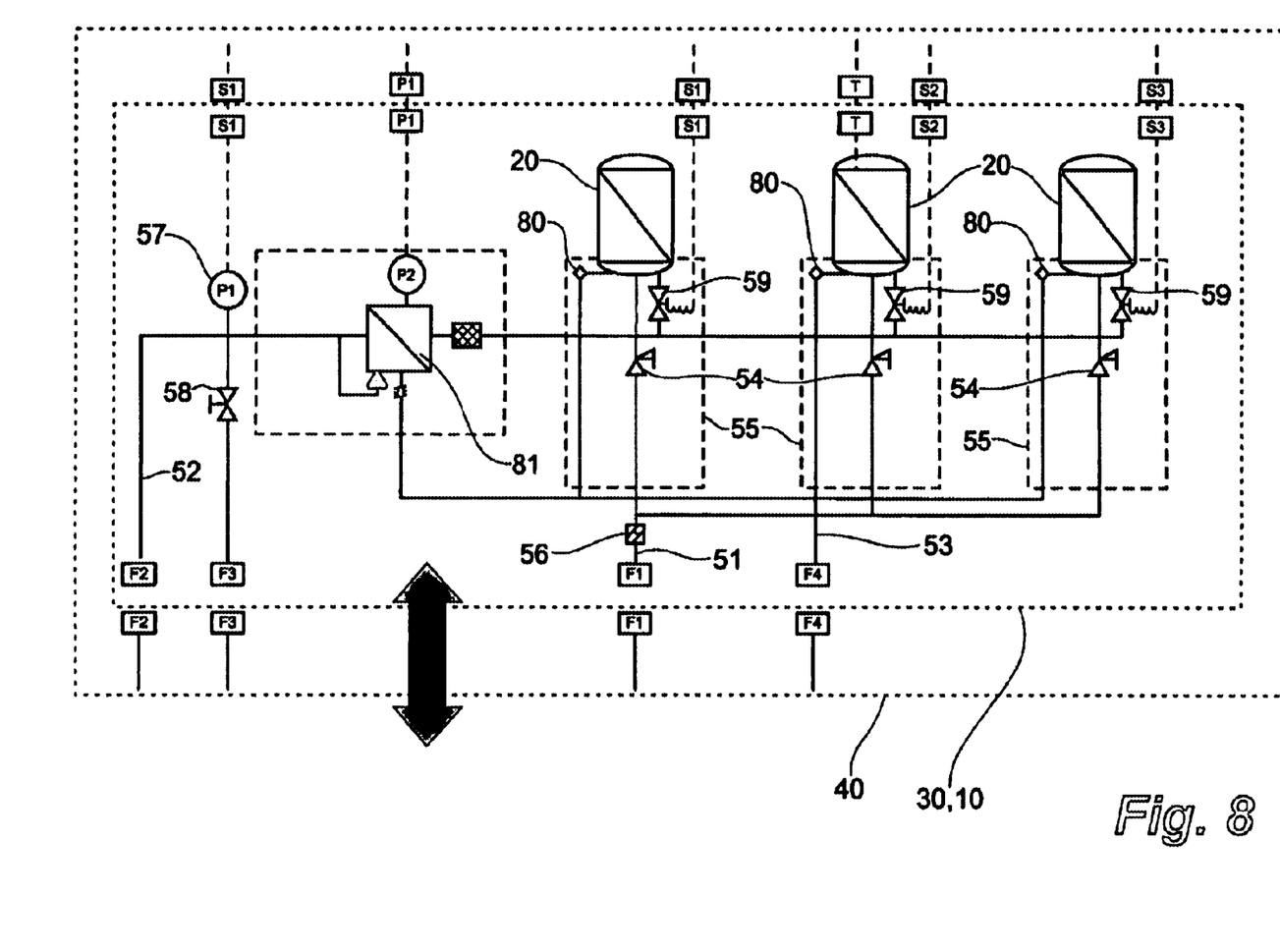
FIG. 8 is a schematic illustrating the valving and tubing connections of the pressurized fuel cylinders using an external pressure regulator.

As shown in FIGS. 7–8, typical fueling lines 50 comprise a fill line 51, a fuel line 52 and a venting line 53 which are connected to corresponding lines (not shown) in the vehicle 100. The fueling lines 50 are carried on or secured to the frame 30 connecting two or more fuel cylinders 20 in parallel. Instrumentation or electrical control lines (not shown), as required, are also carried within the frame 30. Further, the fueling lines 50 converge at a periphery of the frame 30, and the envelope 40, for ease of connection to the corresponding lines in the vehicle 100. Connection is accomplished using releasable fittings between the corresponding lines.

Turning to FIG. 8, the fill line 51 allows the fuel cylinder 20 to be filled with compressed gas from an outside source. Check valves 54 are installed in each fuel cylinder's valve assembly 55. A fuel filter 56 is installed between the filling receptacle (not shown) and the valve assembly 55 to prevent contamination entering the system. Fuel from the fuel cylinders 20 is directed through one ore more pressure regulators 81. A pressure switch 57 (P1), used to shut off the system in case of over-pressure and a manual valve 58 used for defueling, are also connected to the fuel line 52. The venting line 53 is required for gas release from temperature and pressure-activated relief devices (PRD's) 80.

Further as part of a typical instrumentation package, the module 10 is provided with at least one temperature sensor T and one pressure sensor P2 which indicates the pressure inside the fuel cylinder 20 when an electromagnetic or solenoid shut-off valve 59 is opened. As shown in FIGS. 7 and 8, a pressure regulator 81 can be connected externally to the fuel line 52.

Typical parameters for a module 10 as described include 250 or 350 bar (gauge) pressurized fuel cylinders 20 and pressure regulators having transducers in the range of nominal 0–450 bar (gauge).

Preferably, the frame 30 is spaced from the structure of the fuel storage envelope 40 by anti-vibration pads 90 which are compressed when the latching mechanism 60 is actuated.

More preferably, the frame 30 is further provided with means 91 such as wheels or co-operating Teflon slides which are supported by the envelope 40, to assist in removing and inserting the module 10 into and out of the fuel storage envelope 40.

In one embodiment of the invention, as shown in FIGS. 4–7, at least one wheel 92 is attached to the anchoring mechanism 60a and pivotally actuated with the hooks 61, 63. Actuation of the anchoring mechanism 60a to the released position causes the hooks 61,63 to be released and the wheels 92 to pivot to a downward position where they contact the structure of the fuel storage envelope 40 and raise the frame 30 slightly so as to assist in removing or inserting the module 10 into the fuel storage envelope 40. Further, eyelets 101 are provided on each bracket 31, 32 to assist in lifting the module once it has been removed from the vehicle.

In use, a used module 10 is removed for inspection or, if required, is rapidly replaced by a substantially identical replacement module 10. The fittings, which connect the fueling lines 50 on the fuel cylinders 20 to the fuel lines in the vehicle 100, are typically disconnected first. Removal of the used module 10 is accomplished by actuating the anchoring mechanism 60a on the frame 30 to a released position to release the frame 30 from its attachment to the anchors 74 in the structure of the fuel storage envelope 40. While it is not essential to release the frame or disconnect the fueling lines in any particular order, one does avoid disruption of the fuel lines 50 if they are disconnected before releasing the used module. The used module 10 can then be removed from the fuel storage envelope 40 as a unitary structure and either repaired or replaced with a replacement module 10 in the reverse order.

Optionally, in embodiments wherein the handle 72 of the anchoring mechanism 60a is appropriately situated, actuation of the anchoring mechanism 60a, is performed at a location at the periphery of the frame 30 or otherwise remote from the module 10, particularly in envelopes 40 that are severely space-restricted and where access to the anchoring mechanism is difficult.

The embodiments of the invention for which an exclusive property or privilege is claimed are defined as follows:

1. A method of removal and replacement of a used vehicular fuel system module comprising the steps of:

providing at least two modules, a used module and a replacement module, each module having one or more fuel cylinders mounted to a frame, the frame having a latching mechanism;

disconnecting the pressurized fuel cylinders from the vehicle; and actuating the latching mechanism for securing the mounting frame to a vehicular envelope from a first secured position to a second released position; then sequentially;

removing the used module from the vehicle's envelope;

inserting a replacement module into the vehicle's envelope; and then actuating the latching mechanism for securing the mounting frame to the vehicle from a second released position to a first secured position, and reconnecting the pressurized fuel cylinders to the vehicle.

2. The method as described in claim 1 further comprising the steps of:

actuating a handle to actuate the latching mechanism between the first released and second secured position; and sliding the used module from the envelope using sliding means attached to the frame and sliding the replacement module into the envelope.

3. The method as described in claim 2 wherein the handle is actuated from a location at a periphery of the frame.

4. The method as described in claim 3 wherein the handle is actuated from a location remote from the module.

* * * * *